United States Patent Office 3,658,721
Patented Apr. 25, 1972

3,658,721
AMMONIA SYNTHESIS CATALYST
Kenzi Tamaru and Takaharu Onishi, Kanagawa, Mitsuyuki Soma, Tokyo, and Masaru Ichikawa, Saitama, Japan, assignors to Tokyo University, Tokyo, Japan
No Drawing. Filed Feb. 6, 1970, Ser. No. 9,427
Claims priority, application Japan, Feb. 6, 1969,
44/8,941
Int. Cl. C01c 1/04
U.S. Cl. 23—198                           9 Claims

ABSTRACT OF THE DISCLOSURE

Novel catalyst comprising at least one alkali or organo-alkali metal compound and at least one transition metal phthalocyanine or transition metal porphyrin are especially effective in the production of ammonia from nitrogen and hydrogen. The organo-alkali compound can be alkali metal benzophenone ketyls or alkali metal salts of aromatic hydrocarbon.

---

This invention concerns catalyst for a direct ammonia synthesis from hydrogen and nitrogen gases, a process therefor and a process for synthesizing ammonia from hydrogen and nitrogen gases by employing the above-mentioned catalyst.

As the conventional process for synthesizing ammonia adapted to work industrially, there are the Haber-Bosch method, the Claude method and the Mont Cenis method. As the main catalyst, in the former two methods a fused iron oxide is employed, and in the latter cyano-iron complex salts are used as the same as the above. All of the above-mentioned catalysts consist of iron compounds as a main portion and some kinds of promoters as a minor portion. They are used after performing a reduction treatment. Furthermore, these catalysts lose the activity owing to a slight amount of oxygen and/or carbon monoxide.

The catalysts of this invention are quite new species different from the conventional ones in their compositions, and consist of such compounds as are prepared from (1) one or more alkali metals in the Periodic Table, Group I or one or more of organo-alkali metal compounds and
(2) a member selected from a group consisting of transition metal phthalocyanines and transition metal porphyrins, or any combination of materials mentioned above.

These complex compounds correspond to "electron donor-acceptor complexes" or "charge transfer complexes" in which the transition metal phthalocyanines and the transition metal porphyrins are electron acceptors, and the alkali metals and the organo-alkali metal compounds are electron donors.

The said alkali metals include lithium, sodium, potassium, rubidium and cesium.

The organo-alkali metal compounds include alkali-metal benzophenone ketyls and alkali metal salts of aromatic hydrocarbons such as naphthalene and anthracene, rubidium and cesium.

The transition metal phthalocyanines include Fe-, Ni-, Co-, W-, Pt-, Ti-, Mn-, Cr-, Zr-, Hf-, V-, Mo-, Os-, Pd-, Ru-, Rh-, and Ir-phthalocyanines.

The transition metal-porphyrins include Fe-, Cr-, Zr-, Hf-, V-, Mo-, Os-, Pd-, Ru-, Rh- and Ir-porphyrins.

The catalyst of this invention adsorbs a considerable amount of hydrogen and nitrogen gases, and converts catalytically a mixture of hydrogen and nitrogen gases into ammonia at desirable temperatures. No ammonia is formed, however, over alkali metals, organo-alkali metal compounds, transition metal phthalocyanines or transition metal porphyrins alone. In addition, the decomposition of ammonia proceeds reversibly over the catalyst of this invention, in the manner similar to the general ammonia synthesis catalysts. Thus, a high conversion into ammonia is realized at a side of lower temperatures and higher pressures, where an equilibrium ammonia concentration is high.

These catalysts are prepared, for example, by the following procedures:

(i) at least one of alkali metals is mixed with one or more of the transition metal phthaloclyanines or the transition metal porphyrins at a temperature above the melting point of alkali metals.
(ii) a member selected from a group consisting of the alkali metals and organo-alkali metal compounds, and a member selected from a group consisting of the transition metal phthalocyanines and the transition metal porphyrins are deposited over carriers with large surface area, and the resulting mass is heat-treated.
(iii) at least one of the alkali metals or the organo-alkali metal compounds is mixed with one or more of the transition metal phthalocyanines or the transition metal porphyrins in a polar solvent such as tetrahydrofuran, diglyme or dimethoxyethane, and thereafter the solvent is evaporated.

But the other preparations of these catalysts should not be excluded from this invention.

They need neither any promotors nor the reducing treatment for activating the catalyst by means of hydrogen. Furthermore, the catalytic activity does not considerably decrease in the presence of gaseous oxygen and/or carbon monoxide.

The following examples are given illustration of this invention and are not intended as limitations thereof.

EXAMPLE 1

0.5 g. of metal sodium was deposited on an inner wall of a U-shaped glass tube reactor and then 0.1 g. of Fe-phthalocyanine was evaporated thereon. These deposited substances were heat-treated at 200° C. in vacuo to form a deep-colored complex of Fe-phthalocyanine-Na. A mixture of gaseous hydrogen and nitrogen was introduced into the reactor containing the complex thus prepared, and was circulated at a rate of 12 ml./min. The volume of the circulating system was about 140 ml. The surface area of the complex catalyst was estimated ca. 1 m.$^2$/g. by the BET method. Ammonia was collected in a cooler and quantitatively analyzed by gas chromatography and infrared spectrometry. The results are shown in Table 1. When the catalyst was exposed to oxygen or carbon monoxide, the catalytic activity did not change appreciably.

TABLE 1

| Partial pressure of introduced gas | | Reaction temperature, ° C. | Yield of ammonia after 20 hours (ml. s.t.p.) | NH$_3$/N |
|---|---|---|---|---|
| N$_2$ (cm. Hg) | H$_2$ (cm. Hg) | | | |
| 10 | 30 | 110 | 0.26 | 0.02 |
| 10 | 30 | 170 | 0.92 | 0.07 |
| 10 | 30 | 240 | 3.64 | 0.27 |
| 10 | 30 | 260 | 4.60 | 0.36 |
| 30 | 10 | 240 | 1.80 | 0.05 |

EXAMPLE 2

The catalysts were prepared from 0.5 g. of various alkali metals and 0.2 g. of various transition metal pthalocyanines as shown in the following Table 2 in the same manner as described in Example 1. The results of synthesis of ammonia by using these catalysts are presented in Table 2, where each surface area of the catalysts was ca. 1 m.$^2$/g.

TABLE 2

| Catalyst | Partial pressure of introduced gas | | Reaction temperature, ° C. | Yield of ammonia after 20 hours (ml. s.t.p.) | NH₃/N₂ |
|---|---|---|---|---|---|
| | N₂ (cm. Hg) | H₂ (cm. Hg) | | | |
| K-FePc [1] | 10 | 30 | 240 | 3.2 | 0.24 |
| Na-CoPc [2] | 10 | 45 | 200 | 10 | 0.36 |
| Na-CoPc [2] | 15 | 45 | 240 | 18 | 0.42 |
| Na-WPc [2] | 10 | 45 | 240 | 5.8 | 0.19 |
| Na-PtPc [2] | 10 | 45 | 240 | 2.1 | 0.07 |
| Na-ClTiPc [2] | 10 | 45 | 240 | 5.2 | 0.17 |

The volumes of the reaction systems are:
[1] About 100 ml.
[2] 210 ml.

NOTE.—Pc=phthalocyanine.

EXAMPLE 3

0.5 g. of metal sodium and 0.2 g. of Fe-phthalocyanine were deposited on 0.1 g. of an activated carbon having a surface area of ca. 600 m.²/g., from which a catalyst was prepared. By using the catalyst, ammonia was synthesized and the result is shown in Table 3. The volume of the reaction system was about 140 ml.

TABLE 3

| Partial pressure of introduced gas | | Reaction temperature, ° C. | Yield of ammonia after 20 hours (ml. s.t.p.) | HN₃/N |
|---|---|---|---|---|
| N₂ (cm. Hg) | H₂ (cm. Hg) | | | |
| 10 | 45 | 25 | 0.3 | 0.015 |
| 15 | 45 | 50 | 1.2 | 0.06 |

EXAMPLE 4

The catalyst was prepared from 0.5 g. of metal sodium and 0.2 g. of transition metal tetraphenylporphyrin as described in the following Table 4 in the same manner as described in Example 1 and by using the resulting catalyst, ammonia synthesis was effected. The result is shown in the following Table 4. The volume of the reaction system was about 140 ml.

TABLE 4

| Catalyst | Partial pressure of introduced gas | | Reaction temperatures, ° C. | Yield of ammonia after 20 hours (ml. s.t.p.) | NH₃/N₂ |
|---|---|---|---|---|---|
| | N₂ (cm. Hg) | H₂ (cm. Hg) | | | |
| Na-ClFe(III) tetraphenyl-porphin | 10 | 30 | 110 | 0.2 | 0.01 |
| | | | 240 | 8.2 | 0.41 |
| Na-ClMn (II) tetraphenyl-porphyrin | 10 | 30 | 240 | 0.8 | 0.04 |

What is claimed is:

1. A catalyst for synthesizing ammonia which consists essentially of complex compounds produced by mixing:
   (1) at least one alkali metal selected from the group consisting of: lithium, sodium, potassium, rubidium and cesium, or at least one organo-alkali metal compound selected from the group consisting of alkali metal benzophenone ketyls and alkali metal salts of aromatic hydrocarbons with
   (2) at least one of transition metal phthalocyanine or transition metal porphyrins, wherein transition metal is Fe, Ni, Co, W, Pt, Ti, Mn, Cr, Zr, Hf, V, Mo, Os, Pd, Ru, Rh or Ir.

2. A catalyst according to claim 1 wherein the complex is prepared by mixing the component in a polar solvent selected from the group consisting of tetrahydrofuran, dimethoxyethane and diglyme.

3. A catalyst according to claim 1 wherein the aromatic hydrocarbon is selected from the group consisting of naphthalene and anthracene.

4. A catalyst according to claim 1 wherein the ratio of alkali metal to transition metal phthalocyanine or porphyrin is about 5 parts by weight of the former to about 1 to 2 parts by weight of the latter and wherein the catalyst is subjected to a heat treatment at about 200° C.

5. In a process for synthesizing ammonia from hydrogen and nitrogen in the presence of catalyst at elevated temperature, the improvement which comprises employing one of the catalyst prepared by the process of claim 1.

6. A process according to claim 5 wherein the catalyst is employed on a carrier.

7. A process according to claim 5 wherein the reaction temperature is between 110° and 260° C.

8. A process according to claim 5 wherein the aromatic hydrocarbon is selected from the group consisting of naphthalene and anthracene.

9. A process according to claim 5 wherein the catalyst comprises 0.5 part by weight alkali metal and 0.1 to 0.2 part by weight phthalocyanine or porphyrin heat-treated at about 200° C.

References Cited

UNITED STATES PATENTS

| 3,230,180 | 1/1966 | Larson | 252—431 N |
| 3,108,081 | 10/1963 | Gleim et al. | 252—431 N X |
| 3,029,201 | 4/1962 | Brown et al. | 252—431 N X |
| 3,954,405 | 9/1960 | Hock et al. | 252—431 N X |
| 2,951,799 | 9/1960 | Sharp | 252—431 N UX |
| 3,002,816 | 10/1961 | Friend et al. | 23—199 |
| 1,667,323 | 4/1928 | Larson | 23—198 X |

PATRICK P. GARVIN, Primary Examiner

U.S. Cl. X.R.

252—430, 431 N